United States Patent Office
3,438,992
Patented Apr. 15, 1969

3,438,992
CERTAIN LOWER-ALKYL SULFINYLMETHYL PYRIDINES
Tsung-Ying Shen, Westfield, Alexander Matzuk, Colonia, and Conrad P. Dorn, Jr., Plainfield, N.J., assignors to Merck & Co., Inc., Rahway, N.J., a corporation of New Jersey
No Drawing. Filed Nov. 9, 1966, Ser. No. 592,977
Int. Cl. C07d 31/48, 31/50, 31/02
U.S. Cl. 260—294.8    4 Claims

ABSTRACT OF THE DISCLOSURE

Alkylsulfinylmethyl pyridines are produced by reaction of a chloromethyl pyridine with a metal mercaptide followed by oxidation to the sulfoxide. They are used as anti-inflammatory agents.

---

This invention relates to a method of treating inflammation utilizing novel anti-inflammatory compositions containing heterocyclylmethyl alkyl sulfoxides. In addition, these novel compositions exhibit potent analgesic and antipyretic activity and, therefore, this invention also relates to analgesic and antipyretic methods and compositions. More particularly, this invention is concerned with the use of heterocyclylmethyl alkyl sulfoxides as the active therapeutic ingredient in pharmaceutical compositions.

This invention also relates to certain novel sulfoxides of the structural formula:

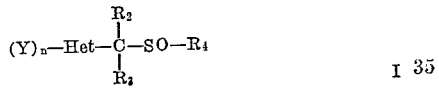

and processes for their preparation, as well as intermediates therefor, wherein "Het" represents 5- or 6-membered heteroaromatic ring compounds having less than three rings. The hereroaromatic rings may contain one or more nitrogen or sulfur atoms; or an oxygen atom together with one or more oxygen, nitrogen or sulfur atoms. Examples of such hereroaromatic rings include thiophene, pyrrole, pyrazole, imidazole, thiazole, oxazole, isoxazole, pyridine, quinoline, pyran, isothiazole, furan, indazole, benzimidazole, benzoxazole, benzisoxazole, benzothiazole, benzodioxane and indole. The heteroaromatic nucleus may be substituted with one or more hydrocarbon groups or with functional substituents (shown as $Y_n$ above, wherein $n$ is 0–2). The hydrocarbon group includes particularly the lower alkyl, such as methyl, ethyl, propyl and butyl; and also includes an unsaturated radical such as lower alkenyl or vinyl, and a cyclic aliphatic residue (cyclic lower alkyl) such as cyclopropyl, cyclopentyl and cyclohexyl. The term "functional substituent" refers to a substituent other than hydrogen or hydrocarbons. The functional substituents include halo, especially chloro, bromo or fluoro, amino, lower alkylamino, di(lower alkyl)amino, hydroxy, lower alkoxy, mercapto, lower alkylmercapto and nitro.

The carbon atom α to the heterocyclic moiety may contain hydrogen or be substituted with a lower alkyl or lower alkenyl group ($R_2$ and $R_3$). $R_4$ may be lower alkyl or lower alkenyl. It is preferred that $R_2$ and $R_3$ be hydrogen and $R_4$ lower alkyl.

The heterocyclylmethyl methyl sulfoxides of this invention represent a new milestone in the continuing search for potent, low toxicity, anti-inflammatory agents. These sulfoxides provide a unique structure-activity relationship which not only has resulted in high anti-inflammatory, antipyretic, and analgesic potency, but also appear to exhibit a biological profile quite different from the salicylates and phenylbutazone.

The above defined sulfoxide compounds are administrated to a patient in a dosage unit form, a pharmaceutically acceptable composition containing a therapeutically effective amount of a heterocyclylmethyl methyl sulfoxide such as 4-methylsulfinylmethylthiazole.

A preferred embodiment of this invention is a method of treating a disease which is symptomatically characterized by pain, fever and/or inflammation which comprises the administration to a patient in dosage unit form of between about 0.01 and 5 gm. of the heterocyclylmethyl aliphatic sulfoxide per day. On a kilogram basis, it is preferred to utilize between about 0.5 mg./kg. and 70 mg./kg. per day of the heterocyclylmehtyl aliphatic sulfoxide of this invention.

Another embodiment of this invention is the provision of pharmaceutical compositions in dosage unit form which comprise from about 5 to 500 mg., and preferably from 25 to 250 mg., of the heterocyclylmethyl aliphatic sulfoxide of the above formula. 4-methylsulfinylmethylthiazole, in oral dosage unit form, comprising about 25 to about 500 mg. is a preferred pharmaceutical composition of this invention.

In a preferred embodiment of this invention, the novel heterocyclylmethyl aliphatic sulfoxides (I) wherein $R_2$ and $R_3$ are each hydrogen, are prepared by reacting a compound having Formula II with an alkali metal $R_4$-mercaptide (III), to form a heterocyclylmethylthio compound (IV), which is then oxidized to form compound (I); as illustrated by the following reaction scheme:

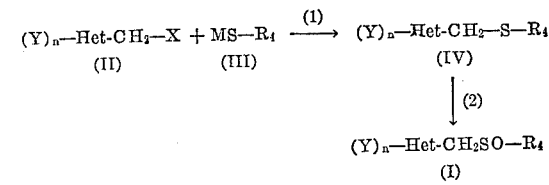

wherein X represents chloro, bromo or iodo and M represents an alkali metal atom.

The above reaction takes place by adding a heterocyclic halomethyl compound (II) to an alcoholic solution of an alkali metal $R_4$-mercaptide (III), prepared by adding an $R_4$-mercaptan to an alcoholic solution of an alkali metal hydroxide, to form compound (IV) (process step 1) and oxidizing compound (IV) to the desired heterocyclylmethyl $R_4$-sulfoxide (1) (process step 2). When an acid salt of compound (II) is used, it is preferred that an alkaline agent, such as potassium hydroxide be added first to the solution of compound (II) before adding compound (II) to the basic mercaptide solution (III).

It is preferred that the reaction mixture in step 1 be basic. Generally the reaction mixture is basic because the $R_4$-mercaptide reactant imparts basicity to the mixture. However, the point at which the reaction mixture is made basic is not critical and therefore if it is desired, compound II and compound III may be mixed in an inert solvent to which is then added a strong base. It is preferred to reflux the mixture overnight; however, reaction temperature and time are not critical and therefore, any suitable time and temperature may be used. The solvent used for this reaction is preferably ethanol, however any inert solvent which is capable of dissolving the reactant may be used. The ratio of reactants may be varied, however it is preferred to carry out the reaction using an excess of $R_4$-mercaptide. The oxidation step 2 may be carried out employing any number of oxidizing agents. Such agents as chromic acid, permanganate, peroxide and alkali metal metaperiodate are among those which can be used. It is preferred, however to use sodium metaperiodate as the oxidizing agent. In the selection of an oxidizing agent, the probability of destroying the heterocyclic function to any extent should be considered. Therefore, it is preferred to use oxidizing agents such as metaperiodate which are incapable of destroying the heterocyclic moiety. It is preferred to use a ratio of 1:1 of oxidizing agent to compound (IV). Using less oxidizing agent will reduce the yield and the use of excess oxidizing agent will further oxidize the sulfoxide compound (I) to the corresponding sulfone.

Generally, the chloro derivative of heterocyclic reactant (II) (X=Cl) is preferred because of its greater availability. If the chloro-derivative is insufficiently reactive for practical purposes, the chloro group in reactant (II) may be replaced by iodo, for example, by heating with an alkali metal iodide.

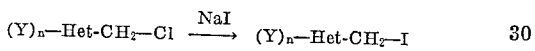

In the alternative, the reaction of a $(Y)_n$-Het-CH$_2$-Cl compound (II) with the alkali metal $R_4$-mercaptide (III) may be carried out in the presence of a small amount of an alkali metal iodide as a catalyst. The heteroaromatic ring compounds (II) where X is halogen are known in some instances. They can also be prepared by known techniques.

In a preferred embodiment of this invention, the —CH$_2$Cl group is introduced into the heterocyclic ring by reaction with formaldehyde and dry HCl, in the presence of a condensing agent such as zinc chloride. In the alternative this reaction can be carried out in two steps by reacting the heterocyclic compound with an aqueous solution of formaldehyde and aqueous HCl to give the hydroxymethyl substituent, which may be converted into the chloromethyl derivative by reaction with thionyl chloride.

The hydroxymethyl derivative may be prepared also from a heterocyclic compound already having a formyl substituent (—CHO) by reduction, for example, with sodium borohydride; or from a heterocyclic compound having a carbonylethoxy substituent (COOC$_2$H$_5$) by reduction, for example, with lithium aluminum hydride. The carbonylethoxy substituent (COOC$_2$H$_5$) may be derived from a corresponding carboxy substituent (COOH) by esterification. The carboxy substituent in turn may be obtained by oxidation of a methyl substituent, all by methods known in the art. Thus, a halomethyl substituent of the heterocyclic reactant (II) may be introduced into the heterocyclic ring directly, or derived from a known heterocyclic compound which has a methyl, carboxy, carbonylalkoxy, formyl, or hydroxymethyl group already present in the ring.

Indole compounds having the following formula:

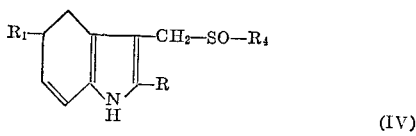

wherein R and $R_1$ represents those substituents previously mentioned for the heteroaromatic moiety can be prepared in two steps by reacting an indole compound having formula V

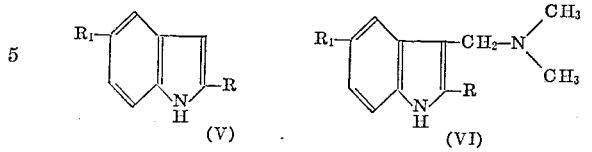

with an aqueous solution of dimethylamine and an aqueous solution of formaldehyde to obtain a compound having Formula VI, wherein R and $R_1$ have the meaning above defined, which compound is then reacted with an alkali metal $R_4$-mercaptide (III) in the presence of dimethyl sulfate. The compounds of Formula V can be readily prepared following the procedures set forth in columns 2 and 3 of U.S. Patent No. 2,825,734. The novel heterocyclic sulfoxide compounds wherein $R_2$ and/or $R_3$ are other than hydrogen are prepared by one of two process steps, depending upon the type of heterocyclic moiety involved. The following process may be illustrated by the following reaction schemes:

(A) Where the heterocyclic moiety contains a nitrogen atom.

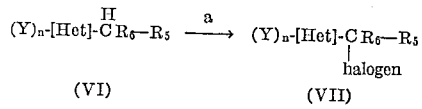

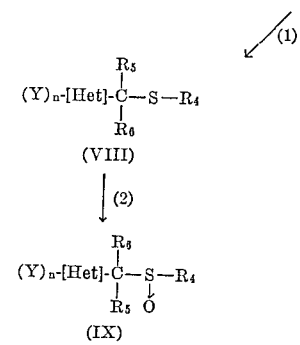

wherein $R_5$ is an alkyl or alkenyl, $R_6$ is hydrogen, alkyl or alkenyl and $R_4$ and Y are as previously defined.

Compound VI is reacted with N-halosuccinimide in an inert solvent such as carbon tetrachloride, preferably in the presence of a catalytic amount of peroxide, at or near ambient temperatures, to form compound VII. Compound VII is then reacted in accordance with step 1 as shown previously for compound II, and the product VIII is further reacted in accordance with step 2 as shown previously for compound IV.

(B) Where the heterocyclic moiety contains oxygen and/or sulfur atoms. Using a sulfur derivative as an example, the following reaction scheme is followed:

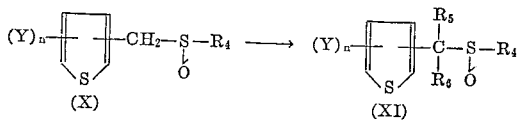

$R_5$ and $R_6$ being hydrogen, alkyl or alkenyl; only one of $R_5$ and $R_6$ being hydrogen at the same time. The thiophene compound X is reacted with an alkyl or alkenyl iodide in the presence of a strong base to obtain compound XI. If it is desired that $R_5$ and $R_6$ each be other than hydrogen, two equivalents of base and iodide are used. If one of $R_5$ or $R_6$ is to be hydrogen, then one equivalent of base and iodide is used per equivalent of the thiophene compound.

Procedure A may also be used to prepare the α substituents for all of the heterocyclic compounds. Therefore, it can be seen that both procedures A and B are applicable to the sulfur and oxygen heterocyclics.

Included within the scope of this invention are compounds wherein the sulfoxide moiety is attached to the nitrogen of the heterocyclic radical. These compounds are prepared by the following reaction scheme:

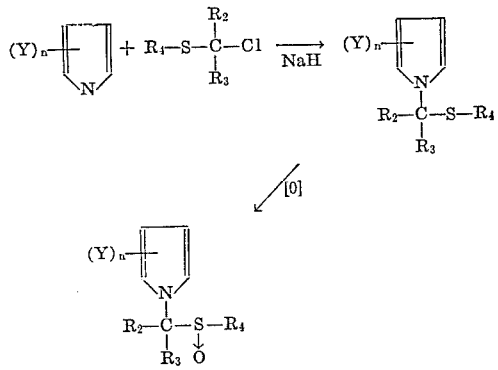

wherein $R_2$, $R_3$, $R_4$, Y and $n$ are as previously defined.

In this reaction scheme, the starting heterocyclic compound is reacted with sodium hydride to activate the nitrogen. This activated compound is subsequently reacted with a chlorosulfide compound to form a heterocyclic sulfide compound, which compound is then oxidized to the desired sulfoxide compound.

EXAMPLE 1.—2-CHLOROMETHYL-5-CHLOROTHIOPHENE

A mixture of concentrated HCl (45.6 ml.) and 37% formalin (45 ml.) is saturated with dry HCl at 0–10° C. with stirring, and added in a slow stream to a mixture of 5-chlorothiophene (71.6 grams) and zinc chloride at 35–40° C. (1 gram). The reaction mixture is then stirred for an additional two hours. Cold water (114 ml.) is then added. The oil which separates is washed two times with cold water. Dicyclohexylamine (2 cc.) is then added and the product distilled under vacuum; the portion boiling at 90–96° C./9–10 mm. is collected.

EXAMPLE 2.—2-CHLOROMETHYLTHIAZOLE

Step A.—Preparation of 2-hydroxymethylthiazole

Thiazole (17 grams, 14.2 moles) and 40% aqueous formalin solution (50 ml.) are heated at about 120° C. for eight hours with agitation. The product is cooled and then acidified with 2.5 N HCl and extracted with ether. The aqueous solution is neutralized with solid potassium carbonate with stirring. The product is then extracted four times with ether. The combined ether extracts are dried over sodium sulfate, filtered and concentrated. The yellow liquid remaining is taken up in 100 ml. of a mixture of 1:1 $H_2O$:conc. HCl. The solution is then filtered and concentrated to give an oil which solidifies. The product is triturated with ethanol, filtered and washed with ethanol to yield 1.76 grams of 2-hydroxymethylthiazole hydrochloride, M.P. 123–125.5° C.

Step B.—Preparation of 2-chloromethylthiazole

The 2-hydroxymethylthiazole hydrochloride (1.76 g.) from Step A is suspended in 16 cc. of dried chloroform. Thionyl chloride (3.57 g., 0.03 mole) in 10 cc. of chloroform is added over a time period of five minutes; the mixture is stirred for one hour at room temperature and then refluxed on a steam bath for one hour and forty-five minutes. The product is cooled, concentrated under vacuum, made alkaline with potassium carbonate and then extracted with ether. The ether extract is dried over sodium sulfate, filtered, and the ether distilled off to give a residue of 2-chloromethylthiazole.

EXAMPLE 3.—4-CHLOROMETHYLTHIAZOLE

Step A.—Preparation of 4-hydroxymethylthiazole 4-formylthiazole (20 grams, 0.177 mole) and ethanol (175 ml.) is added to sodium borohydride (3.4 g., 0.089 m.) in 75 ml. of ethanol. The mixture is stirred and kept at about 25°±2° C. with an ice bath. The addition takes approximately 0.5 hour, and stirring is continued for an additional 1.0 hours at room temperature. Glacial acetic acid (6 ml.) in water (20 ml.) is added dropwise. The product is evaporated under vacuum to a small volume and extracted three times with chloroform. The chloroform solution is washed with saturated sodium bicarbonate and then water. It is then dried and evaporated under vacuum to give 3.44 grams of 4-hydroxymethylthiazole.

Step B.—Preparation of 4-chloromethylthiazole

Thionyl chloride (10 ml.) is added dropwise with cooling to the 4-hydroxymethylthiazole (3.44 grams) of Step A. A vigorous reaction results. After completion, the excess thionyl chloride is then removed under vacuum to yield 4-chloromethylthiazole hydrochloride.

EXAMPLE 4.—3-CHLOROMETHYLPYRAZOLE

Step A.—Preparation of 3-carboxypyrazole 3-methylpyrazole (45 grams) is dissolved in 2700 ml. of water. Powdered potassium permanganate (180 grams) is added in portions starting at room temperature and gradually heating to about 90° C. on a steam bath. After the purple color is gone, the product is filtered and the solid washed with water. The filtrate is evaporated under vacuum to a small volume and then acidified with concentrated HCl to pH-2 and cooled. The precipitate is filtered and washed with cold water and air-dried to give 25.2 grams. The filtrate is evaporated to dryness, extracted with ethanol and evaporated to dryness again. The residue is extracted again with boiling ethanol and taken to dryness to give 23.6 grams. The combined residues equal 48.8 grams.

Step B.—3-ethoxycarbonylpyrazole

Ethanol (300 ml.) is added to the 3-carboxypyrazole (48.8 grams) of Step A. The mixture is saturated with HCl and then refluxed with stirring for about 5 hours. HCl is occasionally passed in. The product is evaporated under vacuum and the solid residue distributed between sodium carbonate solution and chloroform. The chloroform layer is dried and evaporated under vacuum. The residue is recrystallized from boiling methanol to give 36.2 grams of 2-ethoxycarbonylpyrazole.

Step C.—3-hydroxymethylpyrazole

Lithium aluminum hydride (16.3 g.) in 1.5 liters of dry ether is refluxed with stirring overnight with 3-ethoxycarbonylpyrazole (30.3 grams). Water (about 55 milliliters) is added dropwise and the ether is evaporated under vacuum. The residue is treated with methanol and saturated with carbon dioxide. The product is heated to boiling and filtered. The solid is washed with boiling methanol and the methanol solution evaporated under vacuum to small volume. The product is then heated to boiling and filtered. Evaporation of the solvent yields 21.00 grams of a syrup which is the 3-hydroxymethylpyrazole.

Step D.—Preparation of 3-chloromethylpyrazole

Thionyl chloride (35 ml.) is added dropwise to the 3-hydroxymethylpyrazole (21.0 g.) obtained in Step C. The reaction mixture is then warmed on a steam bath for 15 minutes. The excess thionyl chloride is removed under vacuum and the residue washed with ether and dried under vacuum to yield 31.1 g. of 3-chloromethylpyrazole hydrochloride.

EXAMPLE 5.—4-CHLOROMETHYLIMIDAZOLE

Step A.—Preparation of 4,5-dicarboxyimidazole 4,5-di(ethoxycarbonyl)imidazole (100 grams) in 400 ml. in 2.5 N sodium hydroxide solution (400 ml.) is allowed to stand at room temperature overnight. The disodium salt precipitates. It is mixed with concentrated HCl, cooled and filtered. The filtrate is stirred with fresh water, filtered and air-dried to give 72 grams of 4,5-dicarboxyimidazole.

Step B.—Preparation of 4-anilinocarbonylimidazole

A mixture of 4,5-dicarboxyimidazole from Step A (200 grams) and aniline (1000 ml.) is refluxed with stirring for three days. The aniline is then removed by steam distillation. The product is filtered, washed with water and then dissolved in acid. The insolubles are filtered off and the filtrate made alkaline with sodium carbonate. The precipitate is then filtered and washed with water.

Step C.—Preparation of 4-carboxyimidazole

The 4-anilinocarboxyimidazole from Step B is added to 1000 ml. of concentrated HCl and the mixture refluxed for four hours and then taken to dryness. The residue is dissolved in water, made alkaline with sodium carbonate, extracted with ether, charcoaled, adjusted to pH=4 with HCl, and allowed to stand in the cold overnight. The product is then filtered and washed with cold water. The filtrate is evaporated at room temperature and atmospheric pressure. The residue is washed with cold water and air-dried to yield 85 grams.

Step D.—Preparation of 4-ethoxycarbonylimidazole

A mixture of the 4-carboxyimidazole from Step C and 1½ liters of ethanol is saturated with HCl and refluxed until homogeneous. The reaction mixture is evaporated under vacuum. The residue is then dissolved in water, charcoaled, and treated with sodium bicarbonate. The solid is filtered, washed with cold water, and air-dried. The aqueous filtrate is extracted with chloroform, and the chloroform evaporated under vacuum. The total yield of product is 73 grams.

Step E.—Preparation of 4-hydroxymethylimidazole 4-ethoxycarbonylimidazole (28 grams) from Step D is added portionwise with stirring over a half hour period to lithium aluminum hydride (10 g.) in 30 ml. of ether. After the addition is complete, the reaction mixture is allowed to stand overnight. Water (25 ml.) is added dropwise. The resulting solid is filtered and suspended in 300 ml. of hot methanol, saturated with carbon dioxide, and filtered. The product is extracted again with hot methanol. The extracts are combined and evaporated under vacuum. The residue is taken up in 300 ml. of hot ethanol, filtered and evaporated under vacuum. The residue is then treated with ethanolic HCl. The resulting solid is cooled, diluted with ether, and then filtered. The product is then washed with ether and dried under vacuum.

Step F.—Preparation of 4-chloromethylimidazole 4-hydroxymethylimidazole hydrochloride (10 grams) from Step E is suspended in 50 ml. of dry benzene, and 14 ml. of thionyl chloride in 50 ml. of benzene is added slowly with stirring. After addition is complete, the reaction mixture is refluxed with stirring for two hours. It is then evaporated under vacuum, to yield the 4-chloromethylimidazole hydrochloride.

EXAMPLE 6.—2-IODOMETHYL-1,4-BENZODIOXANE

A mixture of 2-chloromethyl-1,4-benzodioxane (12 g.) in acetone (50 ml.) and sodium iodide (9.75 g.) is stirred and refluxed for 3 days. The precipitate which forms is filtered off and washed with acetone. The filtrate is evaporated under vacuum and extracted with chloroform, to yield 14.81 grams of an oil $n_D^{24}$ 1.5780.

EXAMPLE 7.—2-METHYL-3-METHYLTHIOMETHYL-5-METHOXYINDOLE

Step A.—Preparation of 2-methyl-3-dimethylaminomethyl-5-methoxyindole 2-methyl-6-methoxyindole (8.0 grams) is dissolved in 35 ml. of glacial acetic acid with warming. To this solution is added 25% aqueous dimethylamine (9.0 g.) and 37% formaline solution (4.1 g.). A precipitate forms and the mixture is stirred at room temperature overnight. It is then diluted with water and methanol and evaporated under vacuum. The residue is extracted with water and made alkaline with ammonium hydroxide. The precipitate which forms is filtered off, washed with water, and air-dried to give 2-methyl-3-dimethylaminomethyl-6-methoxyindole, M.P. 142–147° C. The product is dissolved in dilute HCl, extracted two times with ether, filtered, and made alkaline with 2.5 N sodium hydroxide. It is then cooled, filtered, washed with water, and air-dried. The product is purified by recrystallization from aqueous acetone solution to yield a product, M.P. 245–249° C.

*Analysis.*—Calc'd for $C_{13}H_{18}N_2O$: C, 71.52; H, 8.31. Found: C, 71.36; H, 8.32.

Step B.—Preparation of 2-methyl-3-methylthiomethyl-5-methoxyindole

To 2-methyl-3-dimethylaminomethyl-6-methoxyindole (2.183 g., 0.01 m.) in 75 ml. of ethanol is added sodium methyl mercaptide (0.012 m.). The mixture is stirred while dimethyl sulfate (1.9 ml., 2.52 g.) is slowly added. The reaction mixture is stirred at room temperature for four hours, heated to reflux for four hours, and then let stand at room temperature overnight. The product is evaporated under vacuum and distributed between water and chloroform. The chloroform solution is washed one time with dilute HCl and three times with water; it is then dried and evaporated under vacuum to give the product.

EXAMPLE 8.—1-METHYLTHIOMETHYLIMIDAZOLE

To a suspension of 0.1 mole of sodium hydride in 50 cc. of dry dimethylformimide, which is stirred under nitrogen and maintained at 0.5° C., is added a solution of 0.1 mole of imidazole in 50 cc. of dry dimethylformamide. The reaction mixture is stirred for 30 minutes after the evolution of hydrogen ceases. Then there is added a solution of 0.12 mole of chloromethylmethylsulfide in 50 cc. of dry dimethylformamide and the reaction mixture is stirred overnight at room temperature. The reaction mixture is concentrated in vacuo, extracted well with boiling chloroform and the combined chloroform extracts are chromatographed on silica gel. Elution with methanol (0–5%) in methylene chloride gives 1-methylthiomethylimidazole.

When the 2-substituted imidazoles are used in place of imidazole in the procedure of Example 8, the following corresponding 2-substituted-1-methylthiomethylimidazoles are obtained:

1-methylthiomethyl-2-methylimidazole
1-methylthiomethyl-2-ethylimidazole
1-methylthiomethyl-2-butylimidazole
1-methylthiomethyl-2-bromoimidazole
1-methylthiomethyl-2-nitroimidazole
1-methylthiomethyl-2-methylthioimidazole.

Similarly, when the 4(5)-substituted imidazoles are used in place of imidazole in the procedure of Example 8, the following corresponding 4-substituted and 5-substituted-1-methylthiomethylimidazoles are obtained:

1-methylthiomethyl-4-methylimidazole
1-methylthiomethyl-5-methylimidazole
1-methylthiomethyl-4-ethylimidazole
1-methylthiomethyl-5-ethylimidazole
1-methylthiomethyl-4-propylimidazole
1-methylthiomethyl-5-propylimidazole
1-methylthiomethyl-4-t-butylimidazole
1-methylthiomethyl-5-t-butylimidazole
1-methylthiomethyl-4-nitroimidazole
1-methylthiomethyl-5-nitroimidazole
1-methylthiomethyl-4-bromoimidazole
1-methylthiomethyl-5-bromoimidazole
1-methylthiomethyl-4-methoxyimidazole
1-methylthiomethyl-5-methoxyimidazole.

Similarly, when benzimidazole is used in place of imidazole in Example 8, there is obtained methylthiomethylbenzimidazole.

When the 3(5)-substituted pyrazoles are used in place of imidazole in Example 8, the following corresponding 3(5) - substituted - 1 - methylthiomethylpyrazoles are obtained:

1-methylthiomethyl-3(5)-methylpyrazole
1-methylthiomethyl-3(5)-ethylpyrazole
1-methylthiomethyl-3(5)-propylpyrazole
1-methylthiomethyl-3(5)-butylpyrazole
1-methylthiomethyl-3(5)-bromopyrazole.

When the 4-substituted pyrazoles are used in place of imidazole in Example 8, the following corresponding 4-substituted-1-methylthiomethylpyrazoles are obtained:

1-methylthiomethyl-4-methylpyrazole
1-methylthiomethyl-4-ethylpyrazole
1-methylthiomethyl-4-propylpyrazole
1-methylthiomethyl-4-bromopyrazole
1-methylthiomethyl-4-chloropyrazole
1-methylthiomethyl-4-nitropyrazole
1-methylthiomethyl-4-ethoxypyrazole.

EXAMPLE 9.—2-METHYLTHIOMETHYL-THIAZOLE 0.1 mole of methylthiothioacetamide and 0.1 mole of chloroacetaldehyde are refluxed for 3 hours under nitrogen. The reaction mixture is poured into ice water, neutralized with sodium bicarbonate and extracted well with ether. The combined ether extracts are dried over sodium sulfate and concentrated to yield crude 2-methylthiomethylthiazole.

When 1-chloro-2-propanone, 1-chloro-2-butanone, 1-chloro-2-pentanone and 1-chloro-2-hexanone are used in place of chloroacetaldehyde in the above example, there was obtained the corresponding 4-substituted-2-methylthiomethylthiazoles.

EXAMPLE 10.—4-HYDROXY-2-METHYLTHIO-METHYLTHIAZOLE

A mixture of 0.1 mole of methylthiothioacetamide and 0.15 mole of chloroacetic acid are refluxed for 3 hours in 250 cc. of toluene under nitrogen. The reaction mixture is filtered while hot and then concentrated to yield crude 4-hydroxy-2-methylthiomethylthiazole.

EXAMPLE 11.—4-METHOXY-2-METHYLTHIO-METHYLTHIAZOLE

To a stirred suspension of 0.05 mole of sodium hydride in 50 cc. of dry dimethylformamide at 0–5° is added dropwise 0.05 mole of 4-hydroxy-2-methylthiomethylthiazole in 50 cc. dry dimethylformamide. After the evolution of hydrogen has ceased, there is added dropwise 0.05 mole of methyl iodide. The reaction mixture is stirred at room temperature overnight, concentrated and extracted between ether and water. The aqueous layer is separated, extracted well with ether and the combined ether extracts dried over sodium sulfate and concentrated to yield crude 4-methoxy-2-methylthiomethylthiazole. Chromatography on 500 gm. of silica gel and elution with methanol in methylene chloride (0–5%) gives pure 4-methoxy-2-methylthiomethylthiazole.

EXAMPLE 12.—5 - CHLORO-2-METHYLSULFINYL-METHYLTHIOPHENE (A) 5-chloro-2-methylthiomethylthiophene A solution of 0.1 mole of sodium hydroxide in 200 cc. of ethanol is saturated with methyl mercaptan. There is then added with stirring a solution of 0.1 mole of 2-chloromethyl-5-chlorothiophene in 50 cc. of ethanol. The reaction mixture is refluxed overnight, cooled and 500 cc. of ether added. The mixture is filtered and concentrated to give crude 2-methylthiomethyl-5-chlorothiophene.

(B) 5-chloro-2-methylsulfinylmethylthiophene

To 210 ml. of a 0.5 M solution of sodium metaperiodate at 0° is added 0.1 mole of 5-chloro-2-methylthiomethylthiophene. The reaction mixture is stirred overnight at 0–5° C. The precipitated NaIO₃ is removed by filtration and the filtrate extracted well with chloroform. The combined chloroform extracts are dried over sodium sulfate and concentrated in vacuo. The residue is chromatographed on 500 grams of silica gel. Elution with methanol-methylene chloride (0–10%) gives 5-chloro-2-methylsulfinylmethylthiophene.

Similarly, when 4-chloromethylpyridine, 2-chloromethylpyridine, 3-chloromethylpyridine, 2-chloromethylthiazole, 4-chloromethylthiazole, 3-chloromethylpyrazole, 4-chloromethylimidazole, 2-chloromethylbenzimidazole or 2-iodomethyl-1,4-benzodioxane obtained from Examples 1–7 are used in place of 2-chloromethyl-5-chlorothiophene in the above example, there is obtained the corresponding heterocyclic sulfinyl compound.

Similarly, when the 1-methylthiomethyl heterocyclic compounds obtained from Example 8 are used in place of 5-chloro-2-methylthiomethylthiophene in part B of the above example, there are obtained the corresponding 1-methylsulfinylmethyl heterocyclic compounds.

Similarly, when the 2-methylthiomethylthiazole, the 4-substituted-2-methylthiomethylthiazoles obtained from Example 9, 4-hydroxy-2-methylthiomethylthiazole obtained from Example 10, and 4-methoxy-2-methylthiomethylthiazole obtained from Example 11 are used in place of 5-chloro-2-methylthiomethylthiophene in part B of the above example, there are obtained the corresponding 2-methylsulfinylmethylthiazole compounds.

Similarly, when 2-methyl-3-methylthiomethyl-5-methoxyindole obtained from Example 7 is used in place of 5-chloro-2-methylthiomethylthiophene in part B of the above example, there is obtained 2-methyl-3-methylsulfinylmethyl-5-methoxyindole.

We claim:
1. A compound of the structure

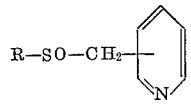

in which R is lower alkyl.
2. 2-methylsulfinylmethyl pyridine.
3. 3-methylsulfinylmethyl pyridine.
4. 4-methylsulfinylmethylpyridine.

References Cited

UNITED STATES PATENTS 3,296,272    1/1967    Johnston _____ 260—294.8

HENRY R. JILES, *Primary Examiner.*

ALAN R. ROTMAN, *Assistant Examiner.*

U.S. Cl. X.R.

260—283, 288, 289, 302, 306.8, 307, 309, 309.2, 310, 313.1, 326.12, 326.13, 326.15, 326.16, 326.5, 329, 332.3, 332.5, 340.3, 347.2, 999